ANALOGUE TO DIGITAL INTEGRATOR

Filed Oct. 7, 1958

INVENTORS,
Chester L. Smith
BY Clyde W. Pinkley
W. E. Thibodeau & A. T. Dupont

United States Patent Office
3,023,376
Patented Feb. 27, 1962

3,023,376

ANALOGUE TO DIGITAL INTEGRATOR

Chester L. Smith, Rockaway, N.J., and Clyde W. Pinkley, 107 E. Burgess St., Mount Vernon, Ohio; said Smith assignor to the United States of America as represented by the Secretary of the Army Filed Oct. 7, 1958, Ser. No. 766,159
1 Claim. (Cl. 331—131)
(Granted under Title 35, U.S. Code (1952), sec. 266)

The invention described herein may be manufactured and used by or for the Government for governmental purposes without the payment to me of any royalty thereon.

The present invention relates to a device which converts analogue information to digital information.

An object of the invention is to provide an electronic device which converts a continuous electrical signal to a discontinuous digital signal which is a function of the continuous signal.

Another object of the invention is the provision of a device which will convert a continuous electrical signal to a constant peak voltage digital signal wherein the frequency of the digital signal is a linear function of the magnitude of the continuous signal.

Another object of the invention is to provide a device which accurately converts a continuous electrical signal into a discontinuous signal for use in an electronic binary counter.

Still another object of the invention is the provision of a device which converts a continuous electrical input signal to a discontinuous output signal wherein the frequency of the output signal is a highly accurate indication of the magnitude of the continuous input signal.

A further object of the invention is to provide a device which converts an electrical continuous wave input signal into an output signal comprising a series of short duration electrical triggering pulses; wherein each pulse represents a constant increment of the area under the time versus intensity curve of the continuous wave input signal.

A still further object of the invention is the provision of a device which efficiently and accurately applies a frequency modulation to a type of relaxation oscillator.

Figure 1:
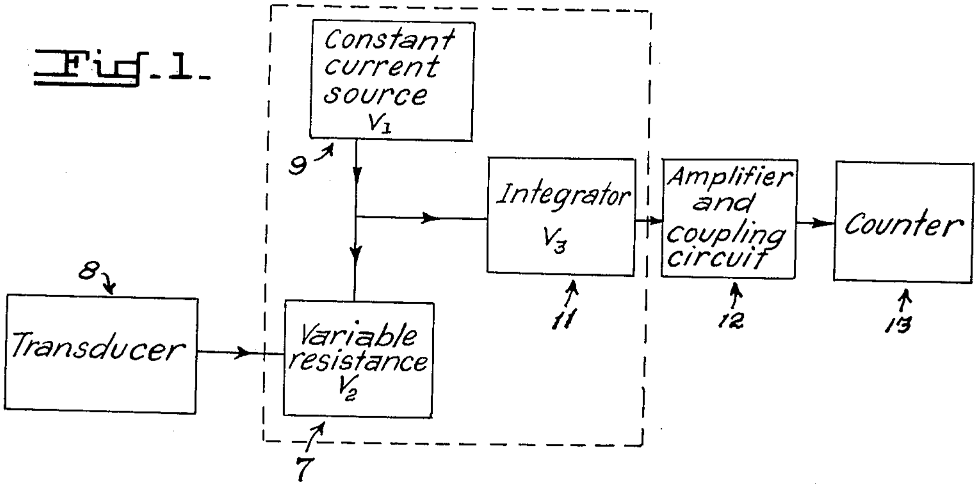
Figure 2:
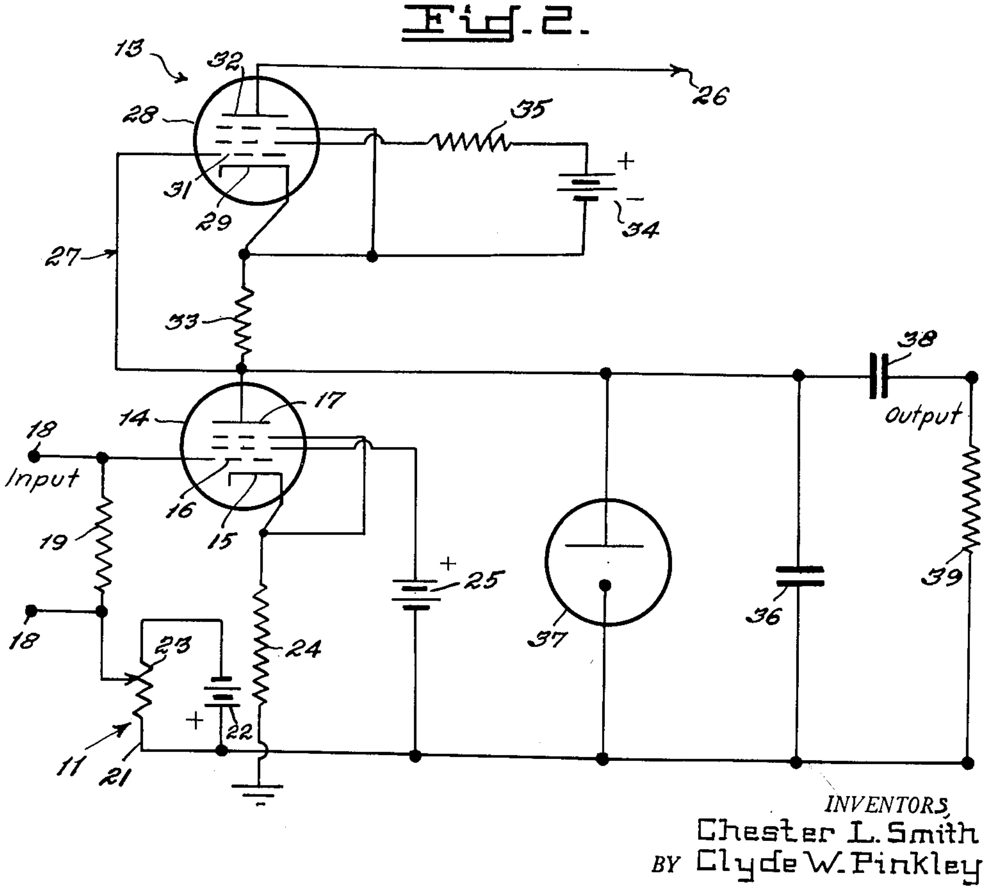

The above mentioned and other features and objects of this invention will become more apparent by reference to the following description taken in conjunction with the accompanying drawings, in which:

FIGURE 1 illustrates a schematic diagram in block form of an embodiment of the invention with other cooperating circuits, FIGURE 2 is a schematic circuit diagram of an embodiment of the invention.

As shown in FIGURE 1 of the drawing the invention consists generally of a signal responsive variable resistance amplifier 7 which receives a continuous electrical signal from a transducer 8. The signal responsive amplifier 7 is in a charging circuit with a constant current source 9 so that the output voltage of the amplifier 7 will be a stable linear function of the continuous input signal without being affected by the circuit voltage source. The output of the signal responsive amplifier 7 is applied to a condenser integrator 11 which includes an integrating capacitor and a gas discharge tube. Hence the time rate of charging of the integrating capacitor will be dependent upon the magnitude of the continuous input signal so that each cycle of the output of the integrator will represent a constant increment of the area of the intensity versus time curve of the continuous input signal.

If the magnitude of the input signal increases, the time rate of charging of the integrating capacitor increases so that the frequency of the integrator output increases.

If the magnitude of the input signal decreases the time rate of charging of the integrating capacitor will decrease and the frequency of the output of the integrator 11 will decrease. Thus it is seen that the invention provides a device which converts input analogue information to digital information so that each spike or pulse of the output signal represents a constant increment of the area under a curve of intensity versus time of the input signal.

The output of the integrator 11 is applied to an amplifier and coupling circuit 12. The amplifier and coupling circuit is electrically connected to a binary counter 13 which renders an indication of the continuous wave input signal.

More specifically, as shown in FIGURE 2 of the drawing the signal responsive variable resistance amplifier 7 includes a pentode vacuum tube 14 having a cathode 15, signal grid 16, and an anode 17. A continuous wave electrical input signal from the transducer 8 is applied to tube 14 through input terminals 18 and resistor 19. A variable D.C. bias means 21, including a D.C. voltage source 22 and a resistor 23, is connected between the cathode 15 and signal grid 16 through a cathode feedback resistor 24 and resistor 19 respectively. The potential of the screen grid of tube 14 is maintained by a D.C. supply 25 connected between the resistor 24 and the screen grid of tube 14.

In addition to amplifier 11, the charging circuit includes a constant current source 9. The constant current source 9 comprises a D.C. voltage supply 26 and a current regulator 27. Current regulator 27 comprises a pentode vacuum tube 28 having a cathode 29, control electrode 31 and an anode 32. A bias resistor 33 is connected between cathode 29 at one end and control electrode 31 and anode 17 of tube 14 at the other end. The potential of the screen grid of tube 28 is maintained by a D.C. voltage supply 34 connected between the cathode 29 and a current limiting resistor 35.

The anode 32 is connected to the 300 volt D.C. supply 26 so as to complete the charging circuit consisting of the signal responsive amplifier 7, current regulator 27, and D.C. voltage supply 26. Tube 28 with associated parameters, is operated in the voltage saturation portion of its characteristic curve. It was found accordingly that the current through tube 28 remained substantially constant for plate voltages between 100 to 250 volts and resulted in less than one percent error in linearity.

Thus it is seen that as the grid 16 of tube 14 is driven more negative the output of amplifier 7 increases as a linear function of the input signal without being affected by the power supply since the current is held substantially constant. As shown in FIGURE 2 of the drawing, this output charging voltage of amplifier 7 is applied across a charging capacitor 36 and a gas discharge tube 37. Hence the charging voltage charges capacitor 36 at a time rate dependent upon the magnitude of the input signal. The gas discharge tube conducts when the charge over the capacitor 36 reaches a first predetermined magnitude or potential and subsequently is rendered nonconductive when the charge thereacross reaches a second lower predetermined magnitude. This produces a saw tooth wave which is converted into spikes by differentiating capacitor 38 and the resistance of the load 39.

In the preferred embodiment 6SJ7's were used for the tubes 14 and 28. The constant current source, a type 6SJ7 Pentode (tube 28) with its associated parameters, is operated in the voltage saturated portion of its characteristics. With a plate voltage of 100 to 250 applied to tube 28 the current was found to be constant within ±3 microamperes thereby providing less than one percent error in linearity. Using a 6SJ7 as tube 14 the current therethrough was substantially linear with respect to the signal applied to the control grid 16 with the plate voltage range of 75 to 200 volts. Hence the voltage available to charge the capacitor 36 is directly proportional to the magnitude of the signal being integrated by capacitor 36 and tube 37. A 5651 gas tube, with a charge-discharge range of 87–107 volts, was used as tube 37 to discharge capacitor 36 to provide a constant increment of energy in each output spike which is subsequently to be applied to a binary counter.

The following are the preferred values of the other components in the circuit shown in FIGURE 2 of the drawing

19, 1 meg ohm
22, 1.5 volts
23, 100,000 ohms
24, 4,700 ohms
25, 75 volts D.C.
26, 300 volts D.C.
33, 10,000 ohms
34, 90 volts D.C.
35, 10,000 ohms
36, value dependent on linear frequency range desired
38, 5 mm. farads With the above components employed in the circuit shown in FIGURE 2, the device was capable of producing well over 7,000 counts per second which represents a constant increment of area of an intensity versus time curve of the input signal.

In the operation of the device the bias means 21 is initially adjusted so that the voltage across the gas discharge tube 37 is slightly less than that required to render tube 37 conductive when no signal is applied to the terminals 18. A continuous wave input signal is then applied to terminals 18. This signal must be connected to the terminals 18 so as to drive the grid 16 more negative with respect to the cathode 15. As the grid 16 is driven more negative with respect to cathode 15 the effective resistance of tube 14 increases. When the resistance of tube 14 increases the resistance of tube 28 decreases so as to tend to maintain the current in the charging circuit constant. This results in the output of the variable resistance amplifier being an accurate linear function of the magnitude of the input signal unaffected by the voltage source.

What is claimed is:

An analogue to digital converter comprising a signal responsive charging circuit including a constant current source, said source having an electron emitting device comprised of a cathode, an anode, and a control electrode, a signal responsive variable resistance means connected to said constant current source having conductor means for applying an input signal to said variable resistance means including an electron emitting device having a cathode, an anode, and a control grid to receive said input signal, a capacitive means connected to said signal responsive charging circuit to alternately receive and discharge electrical energy received from said constant current source, and a discharging means connected to said capacitive means to effect charging and discharging of said capacitive means at predetermined levels of energy, said discharging means comprising a gas discharge tube connected to said capacitive means, said discharge tube having a cathode and an anode, said anode being connected between said constant current source and said variable resistance means.

References Cited in the file of this patent

UNITED STATES PATENTS

| | | |
|---|---|---|
| 2,496,912 | Grosdof | Feb. 7, 1950 |
| 2,549,874 | Williams | Apr. 24, 1951 |
| 2,549,875 | Williams | Apr. 24, 1951 |
| 2,598,516 | Dickinson | May 27, 1952 |
| 2,761,968 | Kuder | Sept. 4, 1956 |
| 2,787,418 | MacKnight | Apr. 2, 1957 |
| 2,824,285 | Hunt | Feb. 18, 1958 |
| 2,835,868 | Lindesmith | May 20, 1958 |
| 2,840,806 | Bateman | June 24, 1958 |
| 2,885,662 | Hansen | May 5, 1959 |
| 2,885,663 | Curtis | May 5, 1959 |

OTHER REFERENCES

Electronic, Jan. 1956, pp. 152–155.

Electron Tube Circuits, Seely, McGraw-Hill, (TK 7870S4), pp. 443–445 and 448–449.